C. S. STEVENS.
SAW CLAMP.
APPLICATION FILED DEC. 7, 1905.
960,208.
Patented May 31, 1910.
2 SHEETS—SHEET 1.
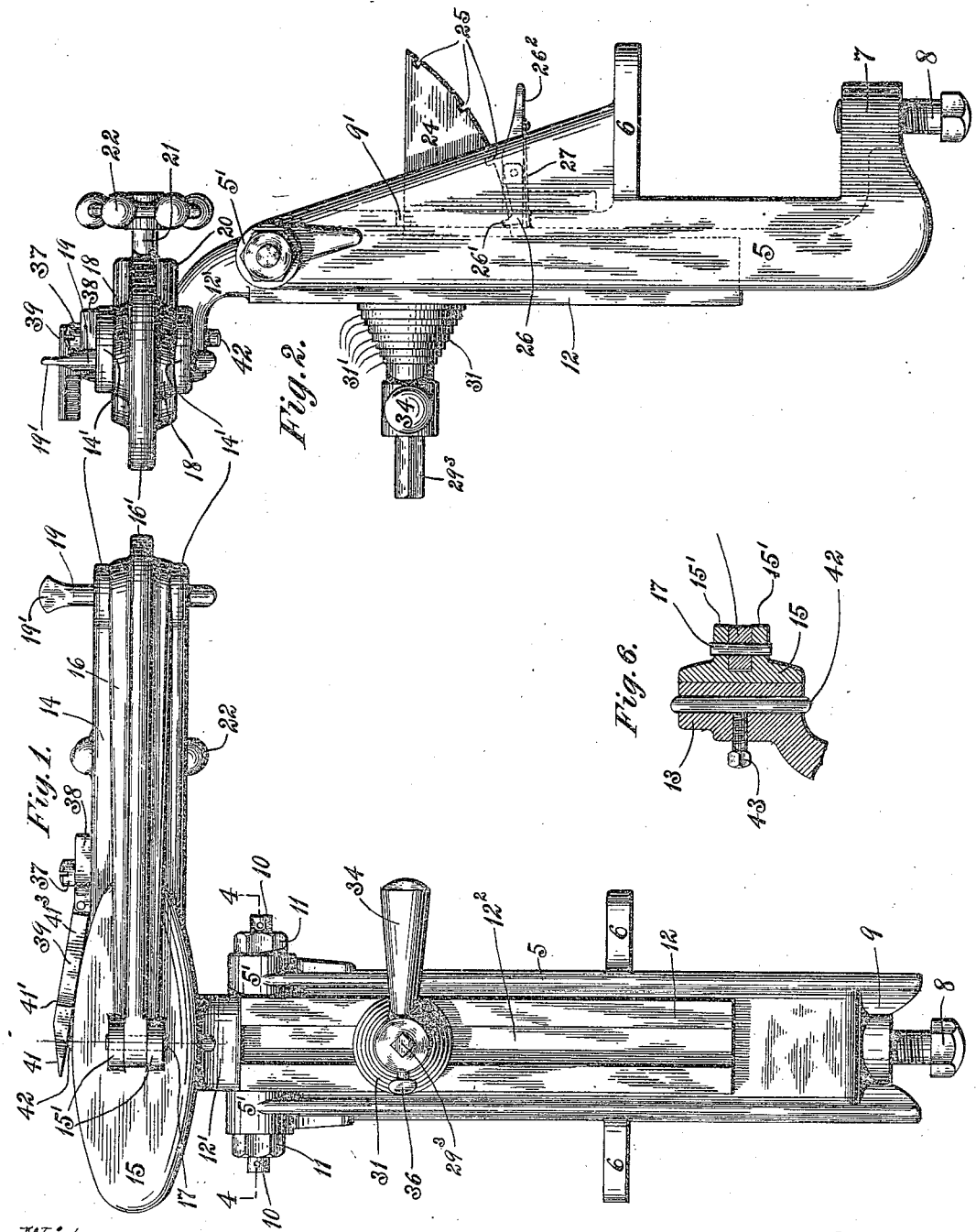
Witnesses:
S. S. Grotta
F. E. Anderson
Inventor:
Clayton S. Stevens,
By his Attorney,

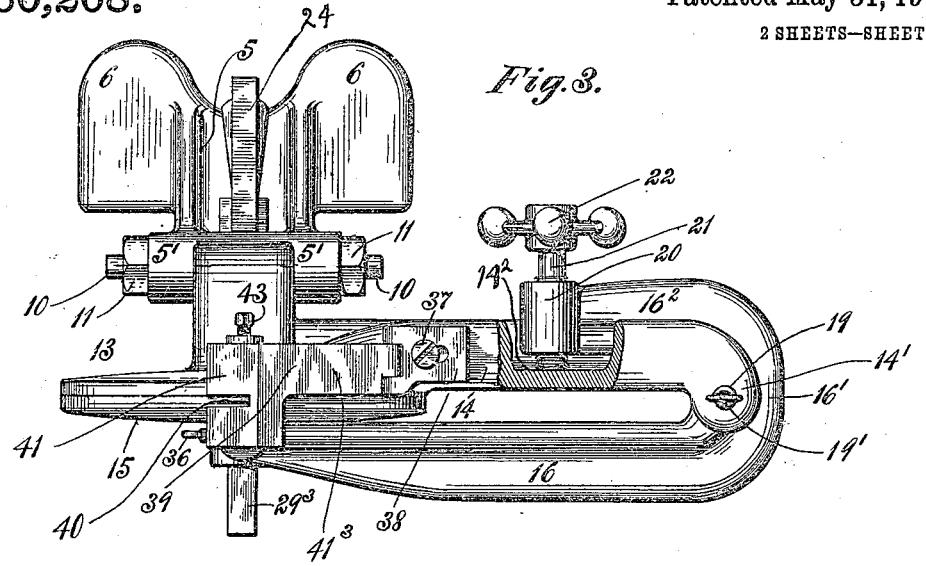
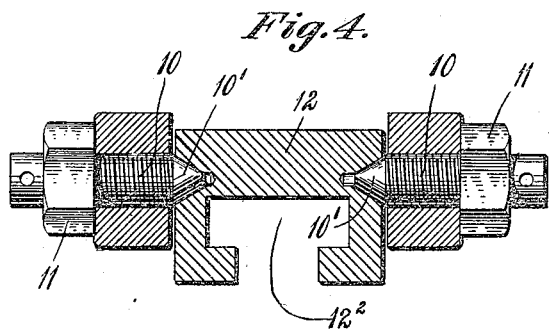
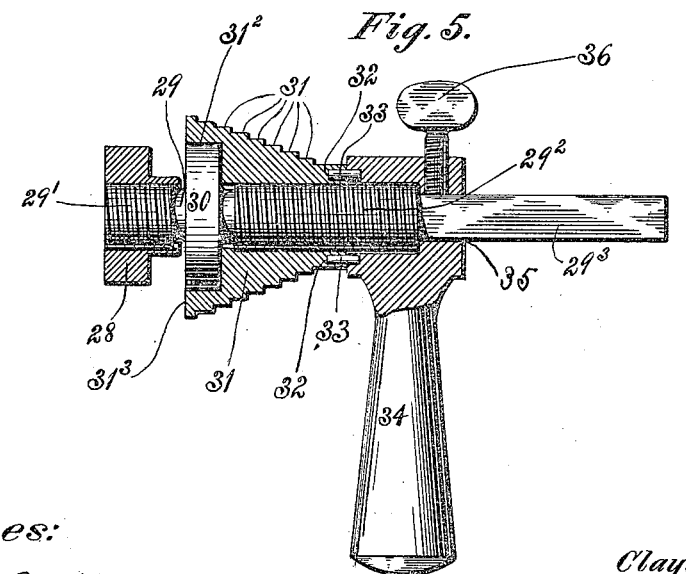

UNITED STATES PATENT OFFICE.

CLAYTON S. STEVENS, OF NEW BRITAIN, CONNECTICUT.

SAW-CLAMP.

960,208.  Specification of Letters Patent.  Patented May 31, 1910.

Application filed December 7, 1905.  Serial No. 290,682.

*To all whom it may concern:*

Be it known that I, CLAYTON S. STEVENS, a citizen of the United States, residing at New Britain, in the county of Hartford and State of Connecticut, have invented certain new and useful Improvements in Saw-Clamps, of which the following is a specification.

This invention relates to clamps for saws, and has for its object the provision of improvements in such devices, whereby circular saws of different diameters may be securely held in position, and adjusted tooth-by-tooth when said clamp is released after the filing operation upon a tooth.

A further object of the invention is the provision of a detachable connection for the movable clamping-jaw, whereby it may be withdrawn bodily after a tooth has been sharpened, thereby avoiding all danger of injury to said tooth when the saw is indexed to bring an additional tooth into place for operation. In this connection it is proper to state that some saws have teeth so formed or swaged that they project laterally on each side, and, therefore, space for such teeth must be provided for when the saw is adjusted to bring an additional tooth into position for operation. In other words the saw-tooth must be free of the clamp before it is advanced to bring another tooth into place for operation, and this is accomplished in the present case by moving the clamping-jaw bodily away from the saw-tooth after it has been operated upon, thus affording free space to enable the next tooth to be brought into position without interference with any part of said clamp.

Further objects of the invention relate to a gage or stop pivotally secured to one of the jaws of the clamp; to means for angularly adjusting said clamp; and to the general details of construction of the device, as will be hereinafter set forth.

In the accompanying drawings, Figure 1 is a side view of a saw-clamp embodying the features of the invention. Fig. 2 is a rear end elevation. Fig. 3 is a plan view. Fig. 4 is a section on line 4—4 of Fig. 1. Fig. 5 is a view, partially in section and partially in elevation, of the arbor and cone upon which the tool to be operated on is held when circular-saws are to be sharpened or otherwise operated upon. Fig. 6 is a partial section on line 6—6 of Fig. 1.

Like characters designate similar parts throughout the several views.

Referring to the drawings, the numeral 5 designates the frame or body of the clamp, which is shown as a casting having lateral offsets 6 and 7, respectively, separated to receive between them the part of a support (not shown) to which the clamp may be secured by a screw or other device 8 carried by the lower offset 7. A longitudinal groove or channel 9 is formed in the front of the body 5, and a slot 9' (see dotted lines Fig. 2) opens into said channel and passes through an inclined reinforce at the end of which the offsets 6 are located. At its top the casting 5 is provided with perforated ears 5' in which are threaded screws 10 having conical tips 10', said screws being locked against rotation by jam-nuts 11, as shown in Fig. 4.

Referring more particularly to Figs. 1 and 2 the numeral 12 designates an extension or standard depending from the fixed jaw 13 of the clamp, said fixed jaw being connected with said extension by a curved offset neck portion 12', and the extension having a T-slot or groove $12^2$ for a purpose hereinafter stated. Extending laterally from said fixed jaw 13 is an arm or bar 14 having perforated ears 14' at its rear end for a purpose hereinafter described, said bar 14 being channeled throughout its length at $14^2$, as illustrated in Fig. 3, and the channel merging in the space between the ears 14'.

Designated by 15 is the movable jaw of the clamp, said jaw having ears 15', separated to receive between them the end of an arm 16, the connection of the arms and jaw being established by a pivot 17. It will be seen that the two jaws are elongated in a direction transverse to the standard or extension 12. At its rear end the arm 16 is curved at 16' and then projected forward at $16^2$ parallel to the arm 14 against the walls of the channel of which it snugly fits. A perforated reinforce or boss 18 projects from each side of the curved part 16' of arm 16 and the flattened sides of said reinforce enter the space between the ears 14', to which the arm is secured by a removable pivot-bolt 19 having a finger-grasp 19'. At its free end the arm 16² is provided with an internally-threaded boss 20 into which is inserted a screw 21 having a grasping-wheel or handle 22. At its outer side the arm 14 of the fixed jaw 13 is channeled at 14² to receive the arm 16² the end of the screw 21 bearing against the bottom of the channel, and the sides of said channel serving as guides to receive between them, and prevent from wabbling, said arm 16². By turning the screw 21 the arm 16 may be moved on its pivot 19 to actuate the movable jaw 15 toward the fixed jaw 13, and by withdrawing pivot 19 the arm 16 and movable jaw may be slid longitudinally to carry said movable jaw away from the fixed jaw, the arm 16² during this action traveling in and being guided by said channel 14².

Projecting from the back of the T-slotted bar 12 is a sector 24, which passes through the slot 9' in the casting 5, and is notched in its edge at 25 for the reception of the nose 26' of a detent or pawl 26, said pawl being actuated by a spring 27, and having a lever-arm or handle 26². It is frequently necessary to adjust the saw and the clamping-jaws at an angle, and this may be accomplished by releasing the pawl 26 and then swinging the arm 12 and the parts carried thereby on the trunnions 10', and when the desired angular adjustment has been made the nose 26' of the pawl will snap into one of the notches 25 and lock the sector in place.

In the channel 12² of depending bar 12 is mounted for sliding movement a T-nut 28, and threaded into said nut is a bolt 29, having a collar 30 intermediate its threaded sections 29' and 29², said bolt also having an angular section 29³ above the threaded section 29². Threaded upon the section 29² of the bolt is a cone or stud 31 having a series of concentric steps 31' of different diameters, said cone being chambered at 31² to fit over the collar 30 and having a flat base 31³ resting upon the top of the slotted bar 12. In the end of the cone opposite its base are recesses 32, to receive pins 33 projecting from a lever wrench 34. This wrench is chambered at 33' to receive the end of the threaded section 29², and opening into said chamber is a passage 35 of the shape of the angular extension 29³ of the bolt, over which it is slipped. A thumb-screw 36 is threaded into the wrench and serves to lock the same to the extension 29³ of the bolt 29.

Circular saws are of different diameters and have different sizes of hub or central openings to receive their arbors. In virtue of the construction just described any size of saw may be fitted on the cone 31, and may be rotated step-by-step, on the step 31' upon which it is fitted.

To adjust the bolt 29 up or down in the slot 12² of bar 12, the screw 36 is released, and the lever-wrench 34 is moved along the extension 29³, thereby withdrawing the pins 33 from their seats in the cone 31, after which the screw is again tightened and the bolt is turned by the wrench to release the nut 28, when the bolt may be adjusted along the slot to the position required, after which the nut is again tightened to lock the bolt in the T-slot, and the saw being placed upon the step of the cone, the lever-wrench (which was withdrawn to enable this to be accomplished) is again slipped over the bolt, its pins 33 enter the recesses in the end of the cone, and the wrench is again secured by the screw 36.

I should state that, and this will be understood from what has been previously set forth, my device comprehends a stud for rotatively supporting a circular saw and two jaws operatively associated with said stud, said jaws being of such a nature that they rigidly clamp the saw for a portion only of its peripheral extent and on a straight-line plane intersecting said periphery at two points. This provides a construction whereby a circular saw can be rigidly clamped at that part which is being filed and it will be clear that I can provide a much simpler construction for properly holding a saw than is present in those clamps comprising circular jaws.

Gages and surfaces upon which the saw-teeth rest are necessary in this class of devices and one form among many that could be employed is illustrated in Figs. 1, 2 and 3, said gage and filing-surface being below described.

To the top of the lateral arm 14 of the fixed jaw 13 is adjustably secured by a screw 37 a slotted plate 38, and to this plate is hinged, so that it may be swung out of the way of the saw, when desired, a gage 39. This gage must be provided with a suitable stop to limit the motion of the saw, and in the present instance this is provided for by forming a slot 40 in an inclined or beveled front face 41 on the free end of the gage, said surface serving as a table upon which the tooth is sharpened by a file, or as an anvil upon which the tooth may be drawn out by swaging. This beveled or inclined surface terminates in a flat top 41' from one side of which the shank 41³ extends, said shank being pivoted to the block 38.

To limit the height of the gage above the reinforced top of the pivoted bar 12 any suitable adjustable rest may be employed, that shown being a rod 42 mounted in a bore of the top of the fixed jaw 13 and retained in any desired position of vertical adjustment by a screw 43.

In use the clamp is secured to a support, the saw to be sharpened is placed upon the step 31' of the cone fitting the opening in its hub, and its blade is introduced between the open jaws of the clamp, the tooth to be filed or otherwise treated entering the slot 40 of the gage 39, and the edge of the tooth beneath the cutting-point thereof abutting against the rear wall of said slot, which acts as a stop. Screw 21 is now turned by means of its hand-wheel 22, and the movable jaw 15 is caused to clamp the saw-blade tightly against the fixed jaw 13. Owing to the position of the screw 21 in the end of the shorter arm 16², and as its end bears against the arm 14 of the fixed jaw it will be seen that a powerful clamping action will be applied to said movable jaw, and the saw will be firmly held against displacement.

After a tooth of the saw has been inserted in the slot 40, as aforesaid, it may be readily sharpened by a file in the usual manner. The inclined surfaces of the gage and the top straight surface of said gage serving as supports for a tooth during the sharpening operation. By clamping the saw with its tooth projecting over the flat surface of said gage, the sides of the tooth may be peened or drawn out by a hammer if desired. After one tooth has been sharpened the screw is turned to release the movable jaw and the saw is rotated to bring another tooth into position to be treated in the same manner.

Should it be desired to withdraw the movable jaw bodily from the fixed jaw, this may readily be accomplished by taking out the pivot-bolt or pin 19, and sliding the lever-arm 16, 16² and the movable jaw to the rear, thus avoiding the necessity of entirely removing the movable jaw when it is desired to inspect the saw, or to remove it, and place another saw in position, the channeled guide back of the fixed jaw serving to prevent displacement of the arm 16² when this result is accomplished. By pivoting the gage in the manner described it may be swung up out of the way when it is necessary to rotate the cam to bring a new tooth into position, and in view of the fact that the block 38 to which said gage is pivoted is slit, and is secured to the arm 14 by means of a screw 37, it is obvious that the gage may be longitudinally adjusted and may also be swung around on its pivot if desired.

Should it be desired to set the clamp at an angle this is readily accomplished by releasing the detent 26 and swinging the hanger 12 carrying the clamp upon its trunnions 10, the degree of angular adjustment being controlled by the position of the detent in any of the notches 25 of the sector 24.

As will be observed the stepped cone 31 is threaded upon the bolt 29, and it is, therefore, capable of vertical adjustment upon said bolt.

By applying a wrench to the squared end of the bolt the nut 28 will be clamped in position at any point desired along the groove 12² of the bar or hanger 12.

While primarily designed for sharpening the teeth of circular saws it is distinctly to be understood that the invention is not limited thereto. Furthermore the teeth of smoothing, clearing and other types of circular saws may be readily sharpened in a device of the character described. Bandsaws, flat-blade saws and in fact many of the types of saws in common use may also be held in the clamp and have their teeth sharpened with ease and despatch.

Changes may be made in many of the details of the invention without departure therefrom. For instance, various means different from those shown may be employed for retaining the bar or hanger to which the jaws are secured in an angular position and the saw may be held on said hanger and adjusted longitudinally thereof by means widely varying from those shown.

Without limiting myself to the precise details shown and described, what I claim is—

1. The combination of a standard, a pair of jaws elongated in a direction transverse to said standard, a saw-supporting stud on said standard, an arm extending from said standard in the same direction as the elongation of said jaws, and a swinging member supported by said arm, one of said jaws being rigid with said standard and the other being supported for swinging movement by said swinging arm, the two swinging parts turning about parallel axes transverse to that of said stud.

2. A saw clamp comprising a fixed jaw, a relatively fixed part to which said jaw is connected, a swinging substantially U-shaped member connected pivotally between its ends to said relatively fixed part, a screw tapped through one branch of said U-shaped member and bearing against said relatively fixed part, and a jaw pivoted to the other branch of said U-shaped member approximately at one end thereof and movable toward and from the fixed jaw on the movement of said U-shaped member.

3. A saw clamp comprising a fixed jaw, a relatively fixed part to which said jaw is connected, a swinging substantially U- shaped member pivotally connected between its ends to said relatively fixed part, means operatively associated with one branch of said U-shaped part and active against said relatively fixed part, for shifting the former, and a swinging jaw connected with the other branch of said U-shaped part.

4. A saw clamp having a fixed jaw, a swinging arm, a jaw pivoted to said swinging arm for movement toward and from the fixed jaw on the swinging movement of said arm, the two jaws being adapted to receive a saw in the space therebetween, and a gage member having a saw stop and also having a saw slot, the latter being adapted to register with said space, and the gage member being movably mounted whereby when it is not in use it can be moved out of the way.

In testimony whereof I affix my signature in presence of two witnesses.

CLAYTON S. STEVENS.

Witnesses:
 FRANCES E. BLODGETT,
 SIDNEY S. GROTTA.